United States Patent
Patzner et al.

(10) Patent No.: US 6,691,590 B1
(45) Date of Patent: Feb. 17, 2004

(54) SINGLE-ROD SHIFTING DEVICE FOR AN AUTOMOBILE MANUAL TRANSMISSION

(75) Inventors: Jens Patzner, Potsdam (DE); Uwe Beer, Fahrland (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 110 days.

(21) Appl. No.: 10/111,180

(22) PCT Filed: Oct. 24, 2000

(86) PCT No.: PCT/EP00/10459

§ 371 (c)(1),
(2), (4) Date: Apr. 18, 2002

(87) PCT Pub. No.: WO01/31233

PCT Pub. Date: May 3, 2001

(30) Foreign Application Priority Data

Oct. 27, 1999 (DE) .......................... 199 51 683

(51) Int. Cl.$^7$ .......................... F16H 63/20; B60K 20/00
(52) U.S. Cl. .................. 74/473.24; 74/473.37
(58) Field of Search .......................... 74/473.37, 337.5, 74/473.24, 473.25, 473.26

(56) References Cited

U.S. PATENT DOCUMENTS

| | | | |
|---|---|---|---|
| 3,486,392 A | * 12/1969 | Ivanchich | 74/473.25 |
| 4,621,537 A | * 11/1986 | Piazza et al. | 74/473.24 |
| 5,186,070 A | 2/1993 | Nitzschke et al. | 74/477 |
| 5,271,291 A | 12/1993 | Knape | 74/477 |
| 5,285,694 A | * 2/1994 | Chene | 74/473.24 |
| 5,297,453 A | * 3/1994 | Chene | 74/473.24 |
| 5,309,785 A | * 5/1994 | Knape | 74/473.24 |
| 5,544,541 A | * 8/1996 | Kruizenga et al. | 74/473.24 |
| 5,724,856 A | * 3/1998 | Back | 74/335 |
| 5,809,836 A | * 9/1998 | Patzold et al. | 74/337.5 |
| 5,893,293 A | * 4/1999 | Earp | 74/335 |
| 5,970,815 A | * 10/1999 | Buerger | 74/473.24 |
| 6,357,316 B1 | * 3/2002 | Bieber | 74/473.24 |
| 6,389,919 B1 | * 5/2002 | Hennequet et al. | 74/473.37 |

FOREIGN PATENT DOCUMENTS

| | | | |
|---|---|---|---|
| DE | 27 50 275 | 5/1979 | ............ F16H/5/06 |
| DE | 30 12 764 A1 | 10/1981 | ............ F16H/5/04 |
| DE | 40 17 957 A1 | 12/1990 | ............ F16H/63/34 |
| DE | 43 35 754 A1 | 4/1995 | ............ F16H/63/36 |
| DE | 198 43 584 A1 | 3/2000 | ............ F16H/63/34 |
| EP | 0 530 466 A1 | 3/1993 | ............ F16H/3/36 |
| JP | 57029120 | 2/1982 | ............ G05G/9/12 |

* cited by examiner

Primary Examiner—David A. Bucci
Assistant Examiner—Julie K. Smith
(74) Attorney, Agent, or Firm—Davis & Bujold, PLLC

(57) ABSTRACT

The single-rod shifting device for a motor vehicle manual transmission, in particular for a six-speed transmission, has a central shifting shaft, fork-shaped shifting elements that engage into sliding bushings, and a locking device. The locking device is equipped with a lever (3, 11) whose rotation point lies on the rotation axis of the axially displaceably mounted central shifting shaft (1) and which is joined to it via a radial entrainment arrangement. Also provided is a blocking part (5) that is arranged immovably in the housing in the shifting direction, as well as a coupling drive that converts the rotation of the lever into a linear motion of the blocking elements (15, 15'...) on the shifting elements and on the blocking part (5) ensure that upon superposition of the blocking elements in the shifting direction, a shifting of the shifting elements is prevented.

11 Claims, 8 Drawing Sheets

SINGLE-ROD SHIFTING DEVICE FOR AN AUTOMOBILE MANUAL TRANSMISSION

The present invention concerns a single-rod shifting device for a motor vehicle manual transmission, in particular for a six-speed transmission, having a central shifting shaft, having fork-shaped shifting elements in the form of shifting links or thrust forks that engage into sliding bushings, and having a locking device which, upon shifting of one of the shifting elements out of the neutral position into a shifting position, locks in their neutral positions the shifting elements that are not to be shifted.

A single-rod shifting device for a motor vehicle manual transmission having fork-shaped shifting links, engaging into sliding bushings, that can be pivoted by at least one shifting shaft about parallel pivot bearings out of their neutral position into shifting positions, in which context locking means arranged in stationary fashion in the transmission housing coact with locking grooves that are configured in locking links secured to the shifting links in such a way that upon pivoting of one shifting link into a shifting position, the other shifting links are locked in their neutral position, is known from the Applicant's DE-A 40 17 957. In this, a two-armed rocker arm mounted parallel to the pivot bearing in the transmission housing is arranged in each case between the shifting links, and engages into the locking grooves via end-located blocking cams.

Locking of the shifting links is thus accomplished in this context by means of a rocker-arm and coupling-member system which does not lock the shifting links that are not to be shifted until shifting of a ratio into the selected gate occurs. The lever system comprises three members if three shifting links are provided. In the case of a pure link shifting system, increasing the number of gear ratios in the transmission also increases the number of shifting links, depending on the gear set configuration. If the locking principle were retained, this would require two additional members in the lever system for each additional shifting link. This makes the system complex, difficult to assemble, and sensitive to tolerances; it acts indirectly and is therefore not positive.

A manually shifted transmission for a motor vehicle transmission having a shifting shaft which allows the transmission ratios to be preselected successively by means of its rotation and to be shifted by means of its longitudinal displacement, is known from EP B 530 466. Provided in this is a blocking element, immobilized with the shifting shaft in its longitudinal direction, with which the transmission ratios that are not to be shifted can be locked, the blocking element being a blocking shaft mounted parallel to the shifting shaft, and an entrainment pin of the shifting shaft being longitudinally guided in a gated guide of the blocking shaft in order to transfer the rotary motion. The shifting shaft comprises shifting sleeves on which are rotatably mounted fork sleeves, on which the shifting forks engaging into synchronizer couplings of the transmission ratios are arranged; in order to shift the gear ratios, radially projecting claws of the shifting sleeves rest against the end faces of the fork sleeves, and the claws engage into annular cutouts of the fork sleeves that are not to be actuated.

It is the object of the present invention to create a single-rod shifting device for a motor vehicle manual transmission, in particular for a six-speed transmission, whose locking device is configured in such a way that the shifting elements that are not to be shifted are already locked upon selection of the shift gate, i.e. before the ratio to be shifted is inserted into the selected shifting gate; which is of simple configuration, comprises few parts and thus is easy to assemble; which is configured in terms of function independently of the number of shifting elements and requires little installation space; which locks securely and nevertheless enables good diagonal shiftability; which has low moving masses and low frictional losses, so that there is little influence on selection and shifting forces; and in which the selection of a further ratio is prevented in every case in which a ratio is already selected, and which is economical to manufacture.

Proceeding from a single-rod shifting device of the kind described in more detail above, this object is achieved with the features indicated in the characterizing portion of claim 1; advantageous embodiments are described in the dependent claims.

What is therefore provided according to the present invention is that by way of a radial entrainment, the rotary selection motion of the axially displaceably mounted central shifting shaft is transferred to a lever whose rotation point lies on the rotation axis of the central shifting shaft; that by means of a coupling drive, the rotary motion of the lever is converted into a linear motion of a blocking part transversely to the shifting direction of the central shifting shaft, the blocking part being arranged immovably with respect to the housing in the shifting direction; that the relative motion of the central shifting shaft relative to the blocking part upon shifting of a ratio is accomplished by way of a corresponding degree of freedom in the radial entrainment itself or within the coupling drive; and that the blocking part and the shifting links or thrust forks have blocking elements which are arranged in such a way that upon superposition of the blocking elements in the shifting direction, a motion of the shifting links or thrust forks to shift the transmission ratios is prevented.

The particular advantage achieved thereby is that because of the configuration of the locking device according to the present invention, it is already activated upon selection of the gate, i.e., that the shifting elements which are not to be shifted are already locked before the ratio to be shifted is inserted into the selected gate.

The invention will be explained in further detail below with reference to the drawings, in which advantageous exemplary embodiments are depicted and in which.

Since shifting devices of this kind are familiar to those skilled in the art, only those components essential for an understanding of the invention are depicted in the Figures; in the individual depictions, identical parts are labeled with identical reference characters.

Figure 1:
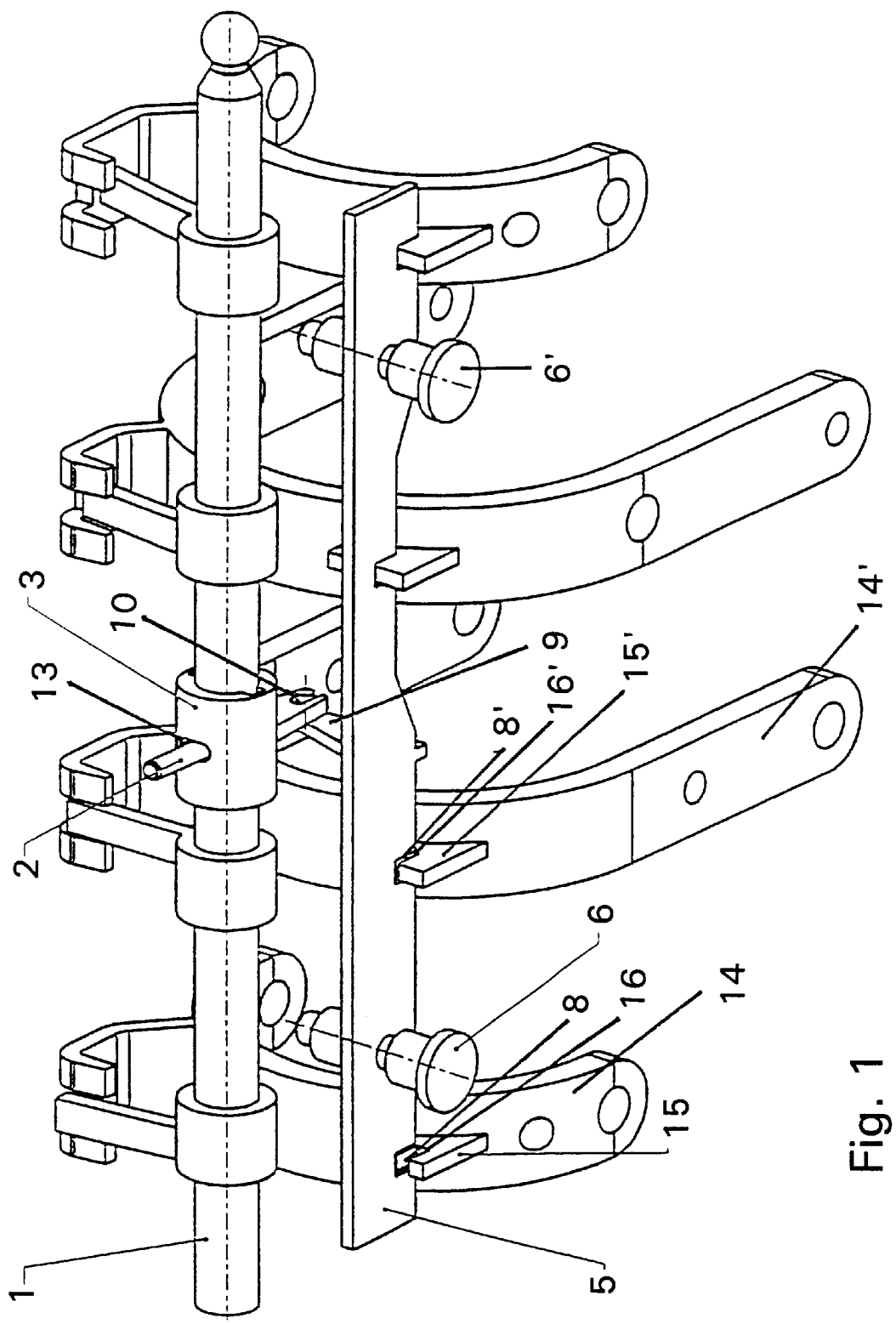
FIG. 1 is a perspective view of the essential components of a single-rod shifting device according to the present invention.
Figure 2:
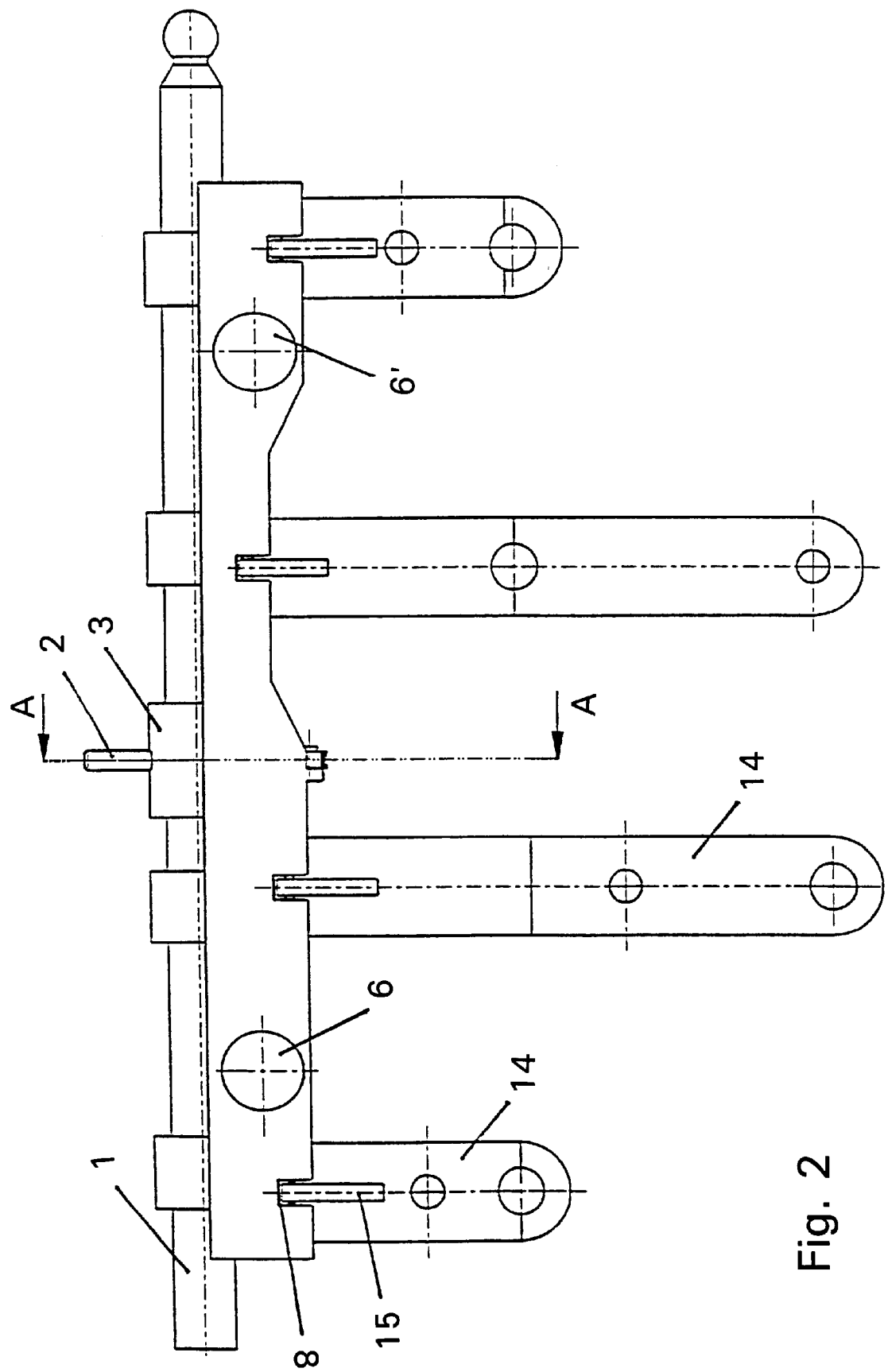
FIG. 2 is a side view of the shifting device.
Figure 3:
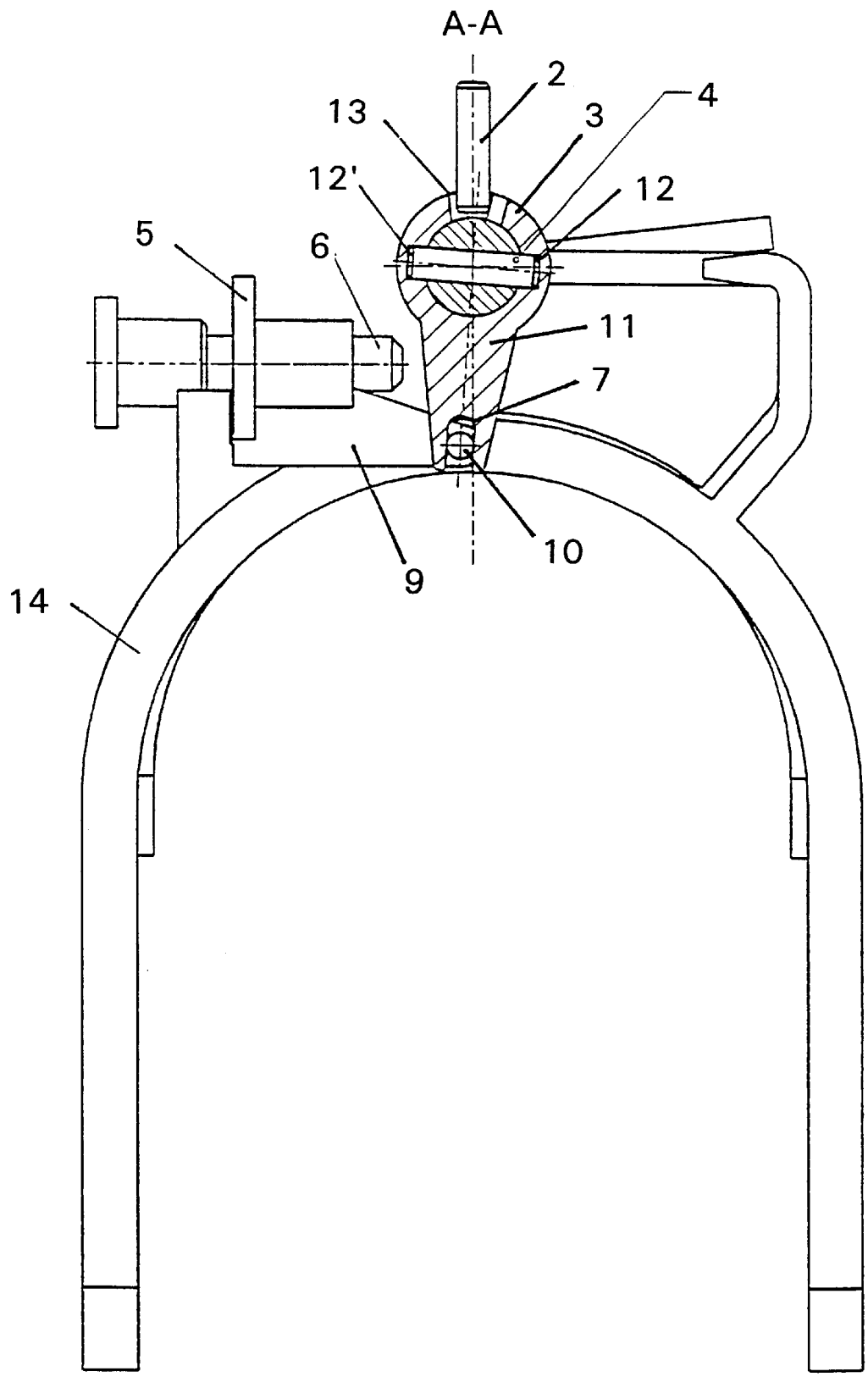
FIG. 3 is a section along line A—A in FIG. 2.
Figure 4:
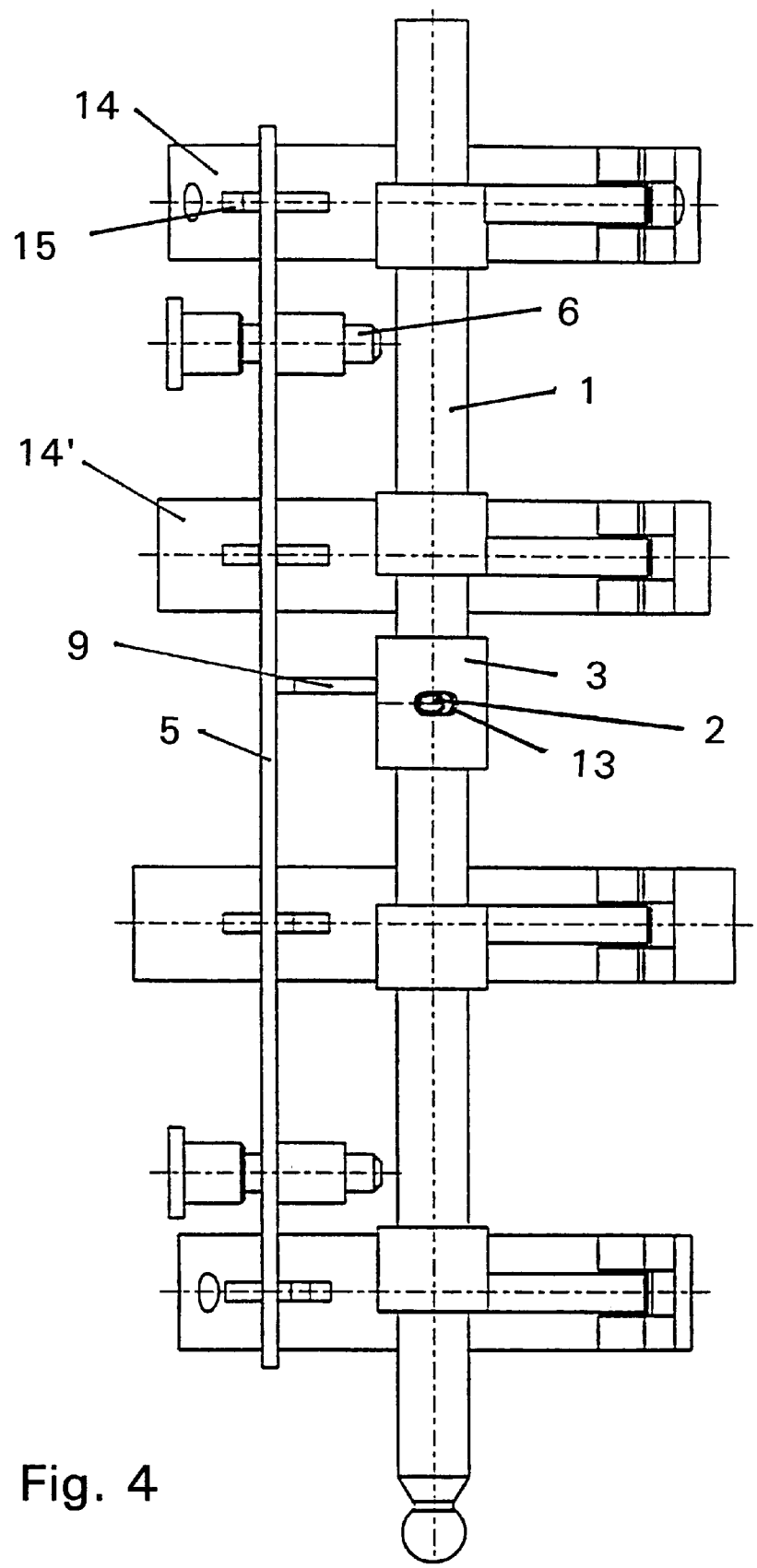
FIG. 4 is a plan view, rotated 90°, of the shifting device shown in FIG. 1.

The single-rod shifting device for the manual transmission comprises a central shifting shaft 1 that is mounted rotatably and axially displaceably in the transmission housing (not depicted). The locking device comprises a blocking panel 5, two guide studs 6, a lever hub 3, an entrainment pin 4 (FIG. 3), and an immobilization pin 2. In the exemplary embodiment depicted, the blocking panel is equipped with four cutouts 8, 8', . . . , two guide sleeves, and a rigid thrust member 9, respectively arranged perpendicular to blocking panel 5. The blocking panel itself is arranged parallel to central shifting shaft 1, and is mounted displaceably on the two guide studs 6 that are immovably joined to the housing.

Rigid thrust member 9 possesses at its one end a stud 10 parallel to blocking panel 5.

A lever hub 3, which together with an extension part 11 forms a lever, is provided coaxially and displaceably with respect to central shifting shaft 1; provided on the lower, free end of extension part 11 is an elongated hole 7 into which stud 10 of blocking panel 5 engages.

Lever hub 3 has on its inside diameter one or two continuous grooves 12, 12' (FIG. 3) into which entrainment pin 4, arranged transversely to central shifting shaft 1, engages. Located on the outside diameter of lever hub 3 is a curved cutout 13, extending transversely to central shifting shaft 1, into which immobilization pin 2, mounted immovably with respect to the housing, engages.

Arranged transversely to blocking panel 5 on shifting elements 14, 14', . . . , which are configured as shifting links or thrust forks, are blocking elements 15, 15', . . . which have longitudinal grooves 16, 16', . . . arranged at an offset from one another in the transverse direction.

Upon selection of a gate, i.e., by rotation of central shifting shaft 1, lever hub 3 is therefore rotated via entrainment pin 4. By way of the thrust-rotary joint arranged between lever hub 3 and rigid thrust member 9 of blocking panel 5, the rotary motion is converted into a longitudinal motion, and blocking panel 5 is moved on its guide studs 6, 6' transversely to central shifting shaft 1 as a function of the rotational position of the central shifting shaft.

Cutouts 8, 8' in the blocking panel engage via blocking elements 15,15' on shifting links 14, 14'; in the regions between the individual shifting gates, the blocking surfaces on the cutouts are superposed on the blocking surfaces of the blocking elements on all the shifting links. Once the rotational travel for reaching a shifting gate has been completed, the blocking panel is then aligned with the corresponding longitudinal groove of the blocking element of the shifting link which shifts the ratio or ratios in the preselected shifting gate. The shifting link or thrust fork is thus free in the longitudinal direction and can be shifted. In the case of all the other shifting links or thrust forks, the blocking surfaces on the blocking panel are superposed on the blocking surfaces on the blocking elements of the links, since the longitudinal grooves in the blocking elements are arranged at an offset to one another corresponding to the selection rotational travel. These shifting links or thrust forks are thus immobilized.

In order to shift a gear ratio, central shifting shaft 1 is displaced in the longitudinal direction relative to the housing and thus relative to blocking panel 5. The configuration of the locking system requires a lever hub 3 that is stationary in the longitudinal direction. For that purpose, lever hub 3 is secured in the longitudinal direction via immobilization pin 2 that is immovable with respect to the housing. Upon rotation of central shifting shaft 1, however, lever hub 3 is guided along in its outer curved groove 13 on immobilization pin 2. Upon displacement of the central shifting shaft, entrainment pin 4 slides along in longitudinal grooves 12, 12' on the inside diameter of lever hub 3.

Figure 5:
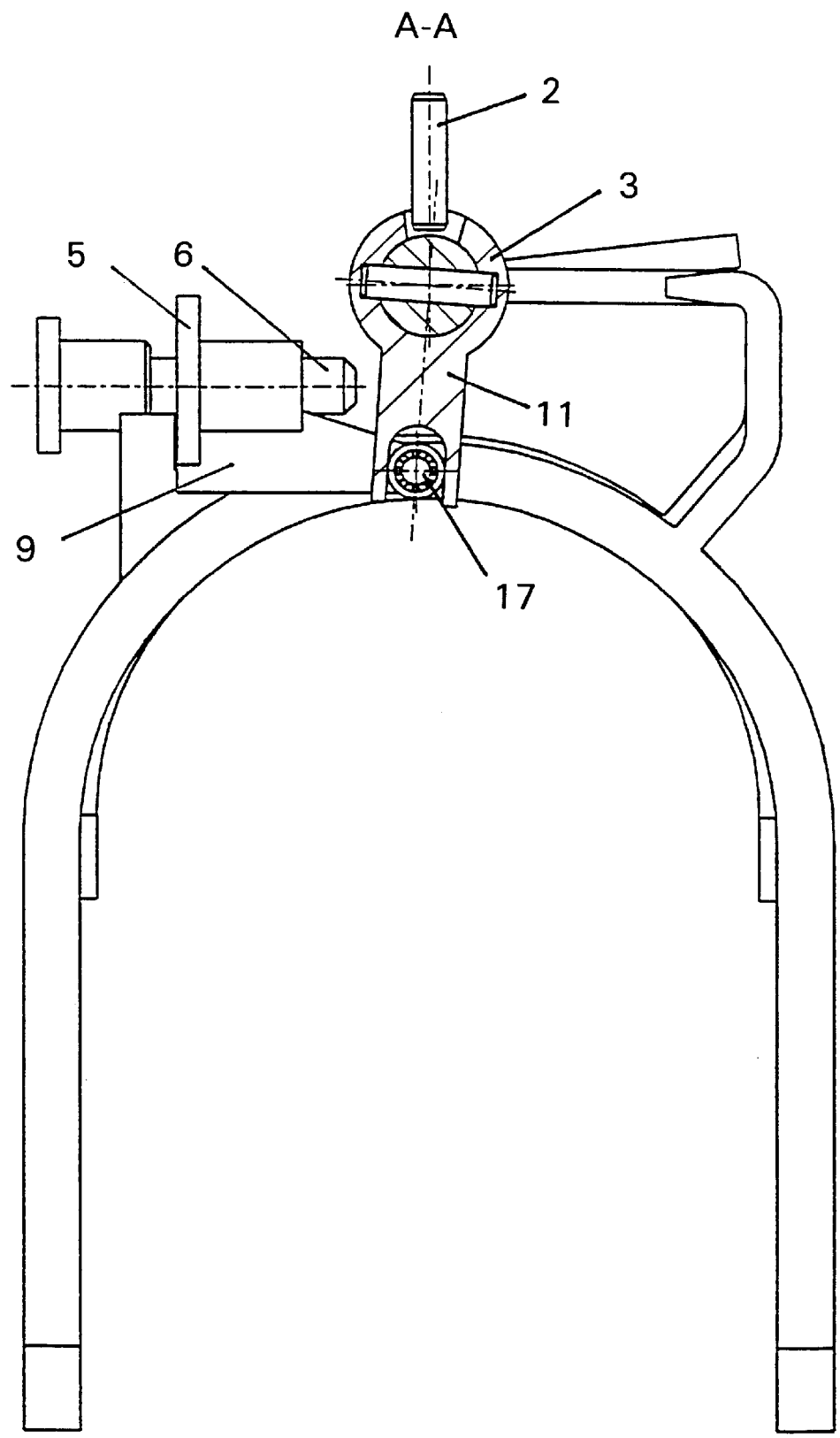
FIG. 5 is a section along line A—A of a further exemplary embodiment.

In the exemplary embodiment depicted in FIG. 5, the thrust-rotary joint between lever 3, 11 and rigid thrust member 9 of blocking panel 5 is equipped not with stud 10 but with a plain-bearing- or needle-bearing-mounted roller 17. Frictional losses in the thrust-rotary joint can thereby be decreased.

Figure 6:
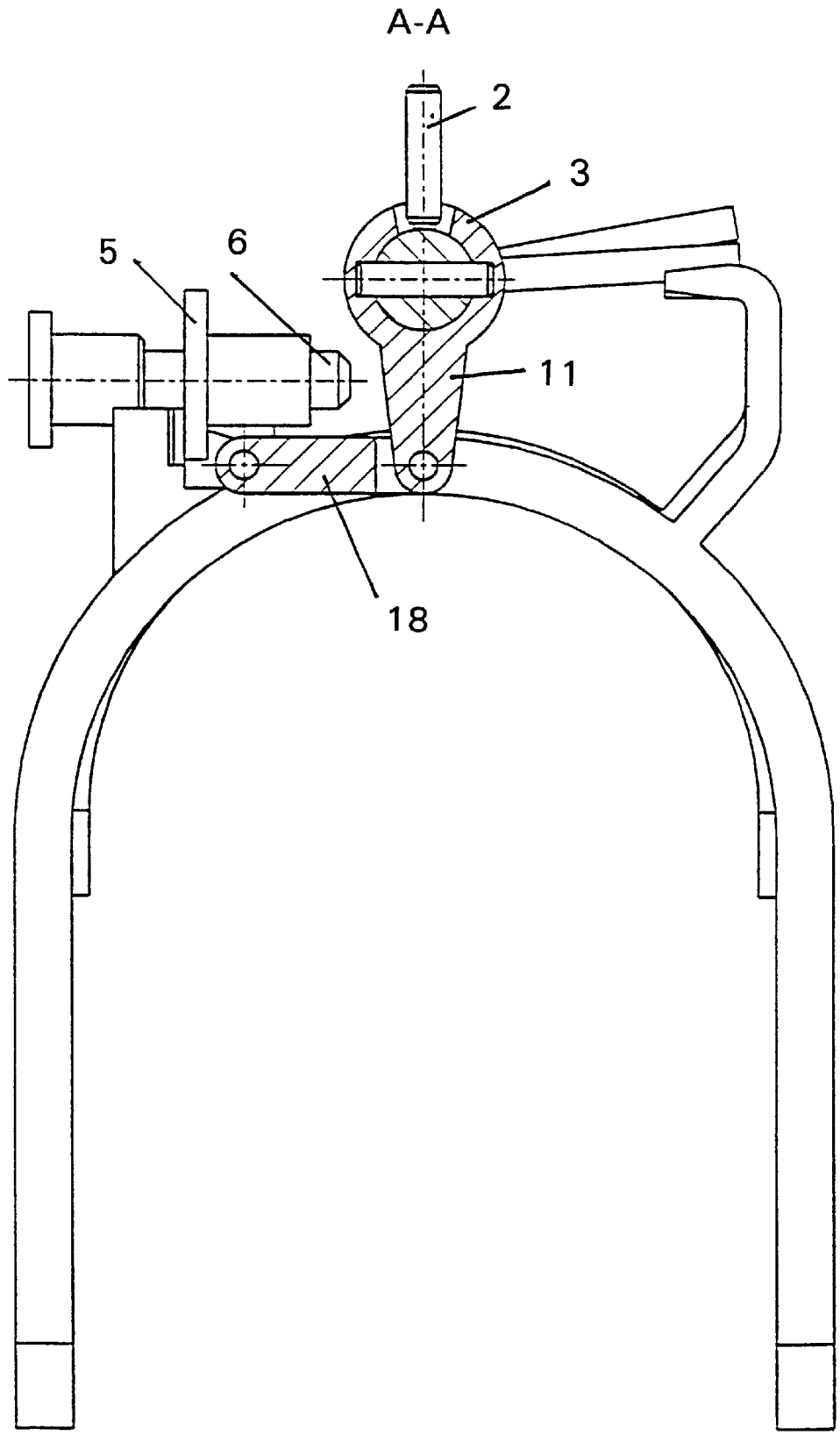
FIG. 6 is that section of another exemplary embodiment.

In the exemplary embodiment depicted in FIG. 6, the thrust member is not secured rigidly to blocking panel 5, but rather is embodied as coupling member 18 between two joints, so that any relative motion along the elongated hole on lever 3, 11 is eliminated and the thrust-rotary joint itself becomes a rotary joint. This results in a further decrease in frictional losses.

Figure 7:
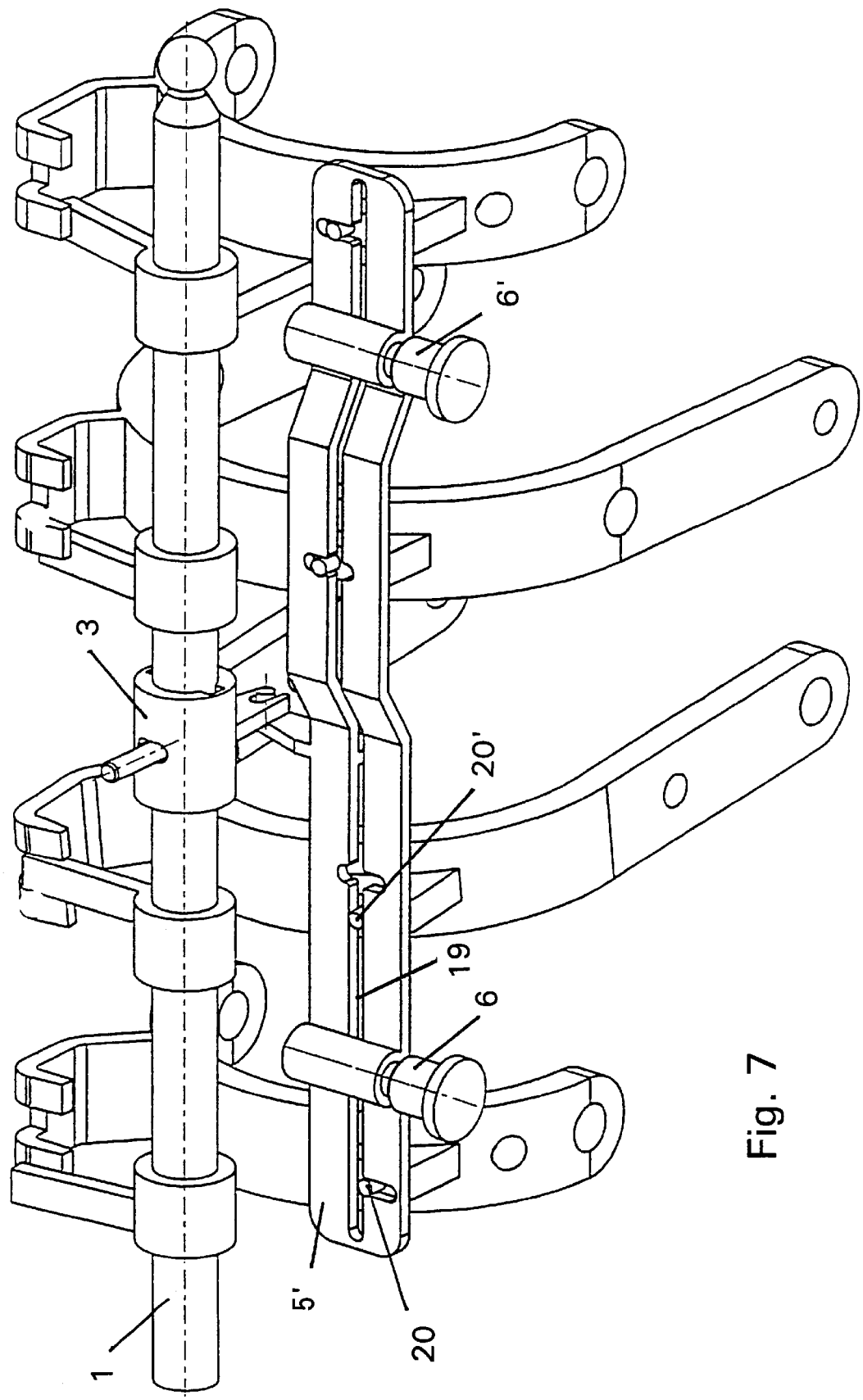
FIG. 7 is a perspective view of a further exemplary embodiment of a single-rod shifting device according to the present invention.

In the exemplary embodiment depicted in FIG. 7, the blocking panel is configured as a horizontal panel 5' having a stamped-out blocking and release contour 19, the blocking elements on the shifting links or thrust forks being configured as vertical pins 20, 20', . . . that can be arranged in alignment with or at an offset from one another in the longitudinal direction.

A combination of the basic variant depicted in FIGS. 1–4 with the variants depicted in FIGS. 5 and 7 is also conceivable.

Figure 8:
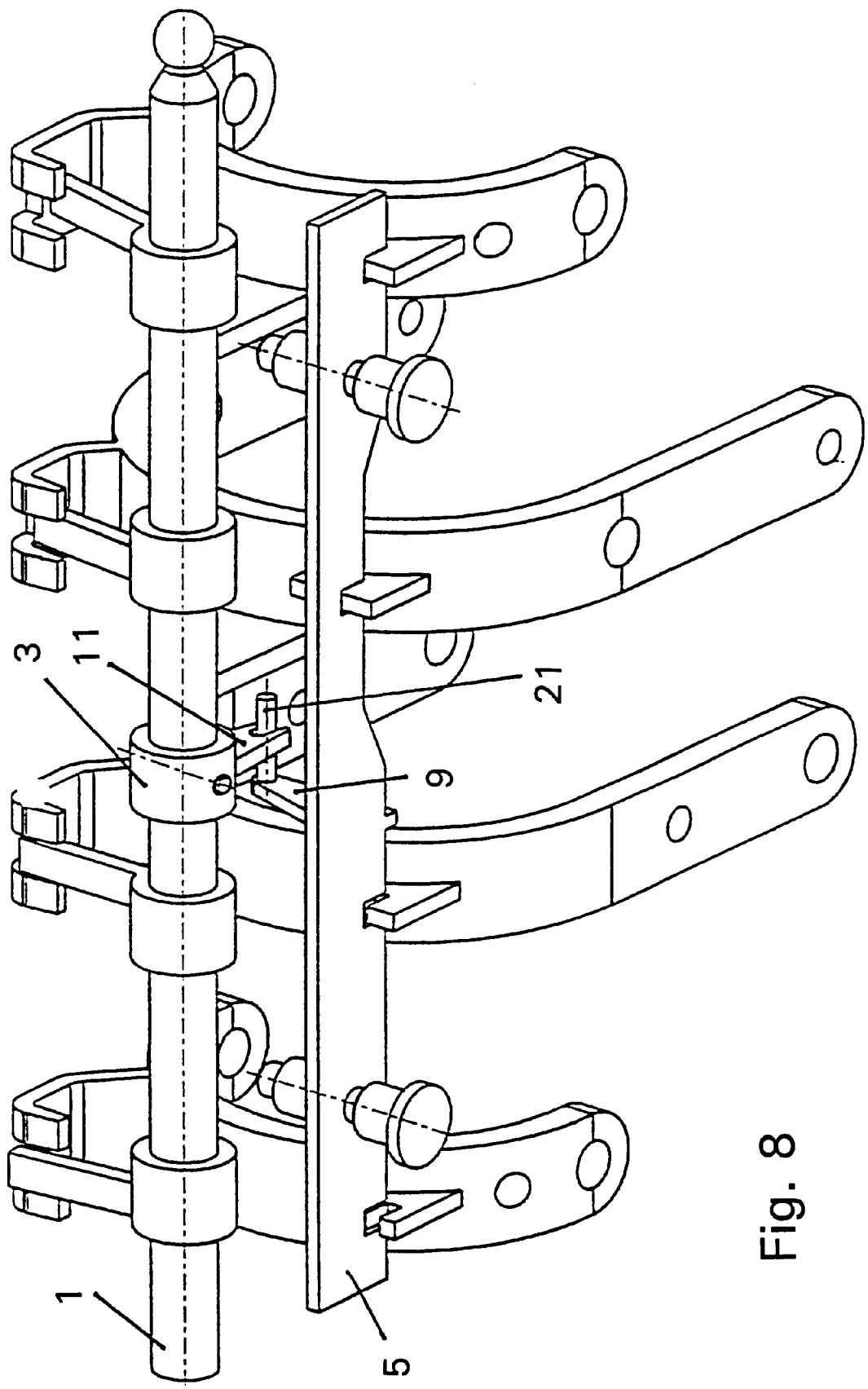
FIG. 8 is a perspective view of another exemplary embodiment according to the present invention.

FIG. 8 shows an exemplary embodiment of a single-rod shifting device according to the present invention in which lever hub 3 is pin-mounted on central shifting shaft 1. An axial relative motion of central shifting shaft 1 relative to blocking panel 5 is made possible by an additional degree of freedom in the thrust-rotary joint. The grooves in lever hub 3 and immobilization pin 2 as shown in FIGS. 1–4 are omitted here. Articulation stud 21 provided in the thrust-rotary joint corresponds to approximately twice the shifting travel.

The shifting device according to the present invention allows a greater number of shifting links or thrust forks to be locked more securely than was possible in the existing art, with no negative effect on function. The number of parts required is small, the configuration of the individual parts is simple, and manufacturing costs are thus economical. The installation space required is limited because of the location in close conformity with the central shifting shaft.

The pairings of the locking elements offer good conditions for easy diagonal shiftability, and can be perfectly matched to the required selection/shifting smoothness.

Reference Characters

1 Central shifting shaft
2 Immobilization pin
3 Lever hub
4 Entrainment pin
5 Blocking part
6 Guide stud
7 Elongate hole
8 Grooves
9 Thrust member
10 Stud
11 Extension
12 Grooves
13 Cutout
14 Shifting element
15 Blocking element
16 Longitudinal groove
17 Bearing
18 Coupling member
19 Blocking and release contour
20 Pin
21 Articulation stud

What is claimed is:

1. A single-rod shifting device for a six-speed motor vehicle manual transmission comprising a central shifting shaft, having fork-shaped shifting elements in the form of shifting links that engage sliding bushings, and a locking device which, upon shifting of one of the shifting elements out of the neutral position into a shifting position, locks in their neutral positions the shifting elements that are not to be shifted, wherein the locking device has a lever (3,11) whose rotation point lies on the rotation axis of the axially displaceably mounted central shifting shaft (1) and which is joined to it via a radial entrainment arrangement; and has a blocking part (5) that is arranged immovably with respect to the housing in the shifting direction; and has a coupling drive that converts the rotation of the lever (3,11) into a linear motion of the blocking part (5) transversely to the shifting direction of the central shifting shaft (1); and has blocking elements (15, 15' . . . ) on the shifting elements (14, 14' . . . ) and on the blocking part (5), which are configured in such a way that upon superposition of said blocking elements in the shifting direction, a shifting motion of the shifting elements (14, 14' . . . ) is prevented.

2. The single-rod shifting device according to claim 1, therein the lever comprises a lever hub (3) and an extension part (11); and the radial entrainment arrangement has a pin (4).

3. The single-rod shifting device according to claim 1, wherein the blocking part is a blocking part (5) that is mounted, displaceably in the transverse direction with respect to the central shifting shaft (1), on several guide studs (6) and is equipped with a plurality of cutouts (16, 16' . . . ).

4. The single-rod shifting device according to claim 1, wherein the blocking elements (15, 15' . . . ) arranged on the shifting elements (14, 14' . . . ) are equipped with longitudinal grooves (8, 8' . . . ) that coact with cutouts (16, 16') on the blocking part (5).

5. The single-rod shifting device according to claim 1, wherein the coupling drive between the blocking part (5) and central shifting shaft (1) is a rigid thrust member (9) that, has on its end facing away from the blocking panel a stud (10) extending parallel to the blocking part (5).

6. The single-rod shifting device according to claim 1, wherein the extension (11) of the lever hub (3) has on its lower end an elongate hole (7) which the stud (10) of the rigid thrust member of the blocking part (5) engages.

7. The single-rod shifting device according to claim 1, wherein the lever hub (3) has on the inside diameter at least one continuous groove (12, 12') which engages an entrainment pin (4) arranged transversely to the central shifting shaft (1).

8. The single-rod shifting device according to claim 1, wherein the coupling drive between the blocking part (5) and central shifting shaft (1) has a thrust-rotary joint having bearing (17).

9. The single-rod shifting device according to claim 1, wherein the coupling drive between the blocking part (5) and central shifting shaft (1) is embodied as a rotary joint (18) that is connected via two joints to the blocking part (5) and the central shifting shaft (1).

10. The single-rod shifting device according to claim 1, wherein the blocking part (5') is arranged substantially in a horizontal direction and is equipped with a stamped-out blocking and release contour (19) into which the blocking elements (20, 20' . . . ) secured on the shifting elements (14, 14' . . . ), in the form of vertical pins, engage in alignment with or at an offset from one another in the longitudinal direction.

11. The single-rod shifting device according to claim 1, wherein the lever hub (3) is pin-mounted on the central shifting shaft (1); and the axial relative motion of the central shifting shaft (1) with respect to the blocking part (5) is enabled by way of an additional degree of freedom in the coupling drive configured as a thrust-rotary joint, by means of an articulation stud (21), provided in the thrust-rotary joint, whose length corresponds substantially to twice the shifting travel.

* * * * *